(12) United States Patent
Numata et al.

(10) Patent No.: US 9,357,180 B2
(45) Date of Patent: May 31, 2016

(54) VEHICLE DRIVING ASSIST DEVICE

(75) Inventors: Yusuke Numata, Kawasaki (JP); Chinatsu Sakurai, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 309 days.

(21) Appl. No.: 13/982,247

(22) PCT Filed: Jan. 27, 2012

(86) PCT No.: PCT/JP2012/051871
§ 371 (c)(1),
(2), (4) Date: Jul. 26, 2013

(87) PCT Pub. No.: WO2012/102391
PCT Pub. Date: Aug. 2, 2012

(65) Prior Publication Data
US 2013/0307986 A1 Nov. 21, 2013

(30) Foreign Application Priority Data

Jan. 27, 2011 (JP) .................................. 2011-015798

(51) Int. Cl.
*H04N 7/18* (2006.01)
*G08G 1/04* (2006.01)
(Continued)

(52) U.S. Cl.
CPC .. *H04N 7/18* (2013.01); *B60R 1/00* (2013.01); *B62D 15/0275* (2013.01); *G08G 1/04* (2013.01); *G08G 1/168* (2013.01); *H04N 7/181* (2013.01); *H04N 13/0239* (2013.01); *H04N 13/0497* (2013.01); *B60R 2300/302* (2013.01); *B60T 2201/022* (2013.01); *B60T 2210/32* (2013.01)

(58) Field of Classification Search
CPC ........ B60R 1/00; G08G 1/04; H04N 13/0497; H04N 13/0239; H04N 7/181
See application file for complete search history.

(56) References Cited

U.S. PATENT DOCUMENTS 6,704,653 B2    3/2004   Kuriya et al.
7,643,935 B2 *  1/2010   Sakakibara et al. .......... 701/494
(Continued)

FOREIGN PATENT DOCUMENTS

JP    59-114139 A    7/1984
JP    02-036417 B2   8/1990
(Continued)

OTHER PUBLICATIONS

International Search Report; PCT/JP2012/051871; May 15, 2012.
(Continued)

*Primary Examiner* — Shawn An
(74) *Attorney, Agent, or Firm* — Studebaker & Brackett PC

(57) ABSTRACT

Provided is a vehicle driving assist device, said device being capable of reliably and accurately warning any driver, regardless of the perception or skill thereof, to avoid collisions with obstacles. Said driving assist device, which uses a monitor in the vehicle to display images taken of the surroundings of the vehicle, has: an imaging unit that is mounted in the vehicle and takes the aforementioned images; an information-acquisition unit that acquires vehicle-speed information; and an image-processing unit that processes image signals configured by the images outputted from the imaging unit. Said image-processing unit contains an image-superimposition unit that superimposes, onto the taken images, images pertaining to the braking distance corresponding to the vehicle-speed information acquired by the information-acquisition unit.

15 Claims, 9 Drawing Sheets

(51) Int. Cl.
  H04N 13/02 (2006.01)
  H04N 13/04 (2006.01)
  B60R 1/00 (2006.01)
  G08G 1/16 (2006.01)
  B62D 15/02 (2006.01)

(56) References Cited

U.S. PATENT DOCUMENTS

| | | |
|---|---|---|
| 8,073,574 B2 | 12/2011 | Yamamoto et al. |
| 2002/0123829 A1 | 9/2002 | Kuriya et al. |
| 2006/0266135 A1* | 11/2006 | Nishikawa et al. .......... 73/866.3 |
| 2007/0118282 A1 | 5/2007 | Yamamoto et al. |
| 2009/0182505 A1* | 7/2009 | Ikeda ............................ 701/301 |
| 2011/0025484 A1* | 2/2011 | Mullick ........................ 340/438 |
| 2011/0060496 A1* | 3/2011 | Nielsen ............. G06Q 10/0631 701/31.4 |
| 2012/0069182 A1* | 3/2012 | Sumi et al. ................... 348/148 |

FOREIGN PATENT DOCUMENTS

| | | | | |
|---|---|---|---|---|
| JP | 2001-322519 A | | 11/2001 | |
| JP | 2006-309552 A | | 11/2006 | |
| JP | 2007-141179 A | | 6/2007 | |
| JP | 2008-084072 A | * | 4/2008 | ............... G08G 1/16 |
| JP | 2009-104543 A | | 5/2009 | |
| JP | 2009-206939 A | | 9/2009 | |
| JP | 2010-028608 A | | 2/2010 | |

OTHER PUBLICATIONS

Written Opinion of the International Searching Authority; PCT/JP2012/051871; May 15, 2012.

An Office Action; "Notice of Reasons for Rejection," issued by the Japanese Patent Office on Dec. 17, 2013, which corresponds to Japanese Patent Application No. 2012-554871 and is related to U.S. Appl. No. 13/982,247; with English concise explanation.

* cited by examiner (A) AT LOW SPEED

⇅ CHANGE DEPENDING ON SPEED CHANGE (B) AT HIGH SPEED

| STOP DISTANCE (m) | DANGEROUS AREA | SEMI-DANGEROUS AREA |
|---|---|---|
| 1-2 |  |  |
| 2-3 |  |  |
| 3-4 |  |  |
| ⋮ | | |

VEHICLE DRIVING ASSIST DEVICE

TECHNICAL FIELD

The present invention relates to a vehicle driving assist device, and more particularly, to a vehicle driving assist device that displays an image, which is captured from a surrounding area of a vehicle, on an in-vehicle monitor when parking or driving such as temporary retreat, for example, back-driving, and also superimposes displays another image on the vehicle surrounding image for assisting the driving.

BACKGROUND ART

A driving assist device has been used, which displays an image that is captured from a surrounding area of a vehicle with an on-vehicle camera on an in-vehicle monitor when parking of a vehicle or driving such as temporary retreat, for example, back-driving. A driver drives the vehicle while seeing the vehicle surrounding image displayed on the in-vehicle monitor, so that the driver is to securely recognize an obstacle. Also, the driver can accurately and easily park the vehicle in a parking zone.

As an applied technology of the driving assist device, the other image for assisting the driving is displayed with being superimposed on the vehicle surrounding image, in addition to the vehicle surrounding image captured with the on-vehicle camera.

In general, a device has been known which displays vehicle path anticipating guide lines with being superimposed on the vehicle surrounding image so as to easily recognize a distance between the vehicle and an object or a horizontal width.

For example, JP-A-2001-322519 discloses a device that calculates a turning angle of a vehicle from a difference between rotating speeds of left and right wheels of the vehicle and displays guide lines with being superimposed on a monitor in accordance with the turning angle. Thereby, a driver can easily know a steering timing, a steering amount or a retreat amount.

Also, JP-B-H2-36417 discloses a device that generates a marker signal in response to an information signal relating to a vehicle driving, including a distance between a vehicle and a surrounding obstacle, a tire steering angle and a driving speed, and displays a marker with being superimposed on a vehicle surrounding image. In this device, a marker interval is changed depending on the driving speed, for example. Thereby, it is possible to confirm an inter-vehicular distance necessary for safety driving.

SUMMARY OF THE PRESENT INVENTION

Problems to be Solved

However, according to the vehicle assistance device disclosed in JP-A-2001-322519, for example, since an actual driving direction of the vehicle and a driving direction on the in-vehicle monitor are different when the driving, it is difficult for the driver to perceive a distance sense. Specifically, in recent years, a wide angle camera has been used so as to capture a surrounding area with a wider image angle. When the wide angle camera is used, a distortion of an image is increased and a screen center becomes smaller, so that it is more difficult for the driver to understand the distance sense or speed sense.

Therefore, as disclosed in JP-B-H2-36417, the marker interval is changed depending on the driving speed, so that the driver can somewhat perceive the speed sense. However, a warning for avoiding a collision with an obstacle is most necessary for safety driving, a perception or skill of a driver is required if the marker distance is simply changed and also it is difficult to reliably and accurately warn any driver to avoid a collision with an obstacle. Also, JP-B-H2-36417 discloses that a distance sensor is mounted. However, it is required that a plurality of sensors is mounted so as to cover a wide surrounding area, so that the cost is increased. Also, when the driving is inexperienced, even if an obstacle is confirmed from a vehicle surrounding image displayed on the in-vehicle monitor or a distance sensor, it is difficult to perceive a preferable distance to the obstacle or a preferable brake-pedaling speed for braking.

Therefore, an object of the present invention is to provide a vehicle driving assist device, which can reliably and accurately warn any driver, to avoid a collision with an obstacle, regardless of a perception or skill thereof.

Means for Solving the Problem

In order to achieve the above object, according to an aspect of a vehicle driving assist device of the present invention, a vehicle driving assist device that displays an image captured from a surrounding area of a vehicle on an in-vehicle monitor includes: an imaging unit that is mounted on the vehicle and captures an image from a surrounding area of the vehicle; an information acquisition unit that acquires speed information of the vehicle; and an image processing unit that processes an image signal of the captured image output from the imaging unit, wherein the image processing unit has an image superimposition unit that superimposes an image, which relates to a braking range depending on the speed information of the vehicle acquired from the information acquisition unit, on the captured image.

According to the above aspect, when driving of the vehicle, the image relating to the braking range depending on the speed information of the vehicle is superimposed on a captured image of the surrounding area of the vehicle. Therefore, it is possible to reliably and accurately warn any driver to avoid a collision with an obstacle, regardless of the perception or skill of the driver. That is, since the driver can more perceive the braking range of the vehicle by the present invention, a position, at which the collision with an obstacle can be avoided if the braking is applied, is clarified. Thus, it is possible to improve the safety in the driving.

Also, the image processing unit may blink the image relating to the braking range. Thereby, the driver can easily perceive the braking range of the vehicle.

Also, the image processing unit may surround the image relating to the braking range with a frame line and blink the frame line. Thereby, since only the frame line is blinked, the driver can more easily perceive the braking range of the vehicle.

Also, the image processing unit may display the image relating to the braking range by using a stripe pattern. Also, the image processing unit may display the image relating to the braking range by using a stripe pattern, and the stripe pattern may be configured by a first color and a second color that is a complementary color of the first color. Thereby, since the image is displayed with the complementary colors, the driver can more clearly perceive the braking range of the vehicle.

Also, the image processing unit may display the image relating to the braking range by a plurality of arrows. Also, leading ends of the arrows may be connected to each other by a line. Thereby, the driver can drive while considering the vehicle driving direction and the braking range.

Also, the image processing unit sequentially displays a shape of the arrow from a vehicle-side towards a driving direction. Thereby, the driver can drive while more considering the vehicle driving direction.

Also, the image processing unit may display the image relating to the braking range, based on the speed information and a free running distance. Thereby, it is possible to accurately provide the driver with information about a braking distance.

Also, a storage unit that stores a brake characteristic in actual braking of the vehicle, which is acquired from the information acquisition unit, is further provided, and the image processing unit may further include a dangerous area calculation unit that calculates a dangerous area corresponding to a collision possibility range of the vehicle, based on the speed information of the vehicle acquired from the information acquisition unit and the brake characteristic stored in the storage unit, and the image superimposition unit may superimpose an image indicating the dangerous area on the captured image.

Like this, the brake characteristic of the vehicle in the actual braking is stored in the storage unit and the dangerous area is calculated and superimposed on the captured image by the image processing unit, based on the speed information of the vehicle and the brake characteristic, so that the driver can accurately perceive a vehicle collision possibility range. Here, the brake characteristic of the vehicle depends on various conditions such as a vehicle weight, a road surface condition, a brake operation of a driver and the like. In this configuration, the brake characteristic of the vehicle in the actual braking is used, to which the above various conditions are added, so that it is possible to provide the driver with the dangerous area more accurately.

Also, the image processing unit may display the image relating to the braking range, based on the brake characteristic and a free running distance. Thereby, it is possible to accurately provide the driver with the information about the braking range.

Also, the brake characteristic may include characteristic information of a speed change of the vehicle in response to elapsed time of a brake operation.

Like this, a speed change of the vehicle in response to elapsed time of a brake operation is acquired as the brake characteristic, so that it is possible to easily acquire the accurate brake characteristic.

Also, the image processing unit may divide and display the image relating to the braking range into a plurality of images in accordance with a degree of urgency of a brake operation to be required.

Like this, the image relating to the braking range is divided and displayed in accordance with the degree of urgency of the brake operation, so that it is possible to provide the driver with the information about the braking range more specifically and to improve the operability when the driving.

The image processing unit may display the divided images with different colors, respectively. Thereby, the driver can easily recognize each of the images.

Also, a storage unit that stores an average value of back-speed of the vehicle acquired from the information acquisition unit is further provided, and the image processing unit may compare the back-speed of the vehicle acquired from the information acquisition unit and a threshold, which is set based on the average value, and superimpose a warning image on the captured image when the back-speed exceeds the threshold.

Like this, the average value of the back-speed is stored and the warning image is superimposed when the back-speed at actual driving exceeds the threshold that is set based on the average value. Thereby, it is possible to further improve the safety of the back-driving. Also, when setting the threshold, the average value of the back-speed that is stored in the actual braking is used. Thus, it is possible to appropriately set the threshold for each vehicle and each driver. Incidentally, the threshold set based on the average value of the back-speed is a speed that is higher than the average value and is to secure safety driving of the vehicle.

Also, according to another aspect of the present invention, a vehicle driving assist device that displays an image captured from a surrounding area of a vehicle on an in-vehicle monitor includes: an image acquisition unit that acquires an image captured from the surrounding area of the vehicle; an information acquisition unit that acquires speed information of the vehicle; and an image processing unit that processes an image signal of the captured image, wherein the image processing unit has an image superimposition unit that superimposes an image, which relates to a braking range depending on the speed information of the vehicle acquired from the information acquisition unit, on the captured image.

Even in the above configuration, since the driver can perceive the braking range of the vehicle, the driver can clearly perceive a position at which the collision with an obstacle can be avoided if the brake is applied. Thus, it is possible to improve the safety in the driving.

Effects of the Present Invention

According to the present invention, when a vehicle drives, the image relating to the braking range depending on the speed information of the vehicle is superimposed on a captured image of the surrounding area of the vehicle. Therefore, it is possible to reliably and accurately warn any driver to avoid a collision with an obstacle, regardless of the perception or skill of the driver. That is, since the driver can perceive the braking range of the vehicle by the present invention, the driver can clearly perceive a position at which the collision with an obstacle can be avoided if the brake is applied. Thus, it is possible to improve the safety in the driving.

PREFERRED ILLUSTRATIVE EMBODIMENTS OF THE PRESENT INVENTION

Hereinafter, a preferred illustrative embodiment of the present invention will be specifically described with reference to the drawings. The shapes and the like of constitutional parts described in the illustrative embodiment are not intended to limit the scope of the present invention and are simply illustrative examples.

Figure 1:
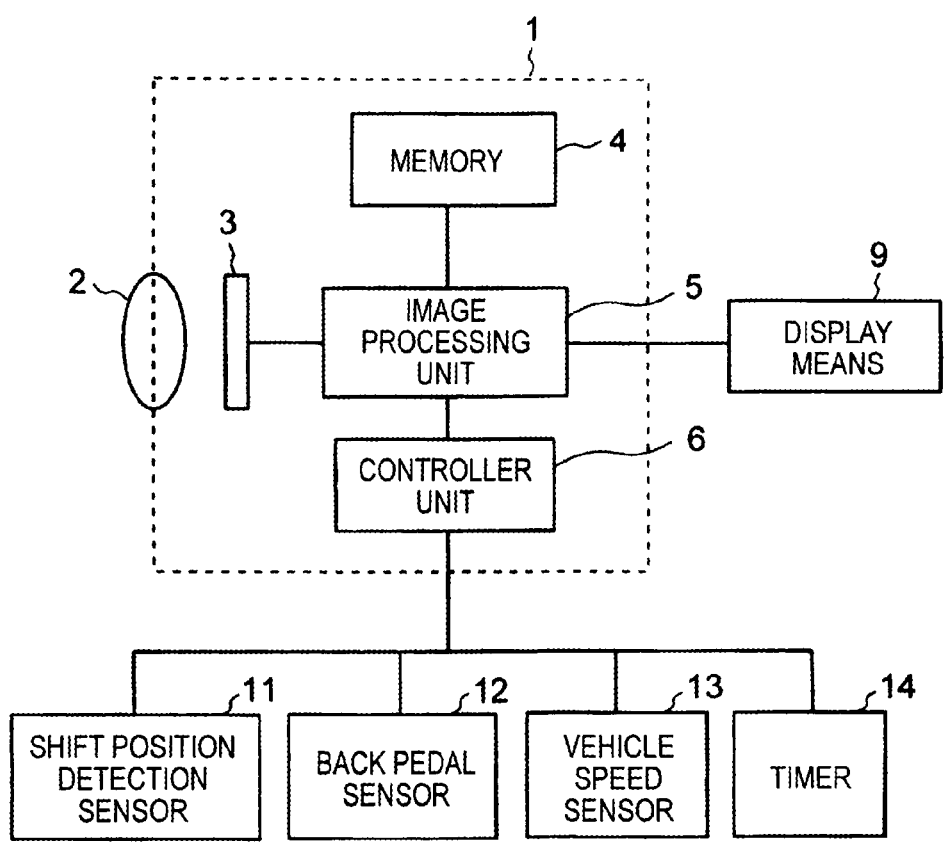
FIG. 1 is a block diagram illustrating a configuration of a vehicle driving assist device according to an illustrative embodiment of the present invention and a peripheral device thereof.

First, a configuration of a back-driving assist device for a vehicle according to an illustrative embodiment of the present invention (which is an example of the driving assist device) is described with reference to FIG. 1. Here, FIG. 1 is a block diagram illustrating a configuration of a back-driving assist device for a vehicle according to an illustrative embodiment of the present invention and a peripheral device thereof.

A back-driving assist device 1 for a vehicle according to an illustrative embodiment of the present invention mainly has an imaging optical system 2, an imaging unit 3, a memory 4, an image processing unit 5 and a controller unit (information acquisition unit) 6.

The imaging optical system 2 is an optical member that makes a light (i.e., an image captured from a surrounding area of a vehicle) be incident onto the imaging unit 3. Specifically, the imaging optical system includes one or plural lenses. The lens is preferably a wide angle lens to acquire a wide area image. Also, the imaging optical system 2 may have other optical members such as filter and the like, in addition to the lenses. The plural optical members are arranged so that optical axes thereof coincide.

The imaging unit 3 is mounted on a vehicle and captures an image of a surrounding area of the vehicle, particularly a rear image. An imaging device that converts an optical image formed on the imaging optical system 2 into an electrical signal, a CCD sensor, a CMOS sensor and the like are used. Incidentally, an A/D converter (not shown) that converts an analog output of the imaging unit 3 into a digital signal is provided between the imaging unit 3 and the image processing unit 5.

Figure 2:
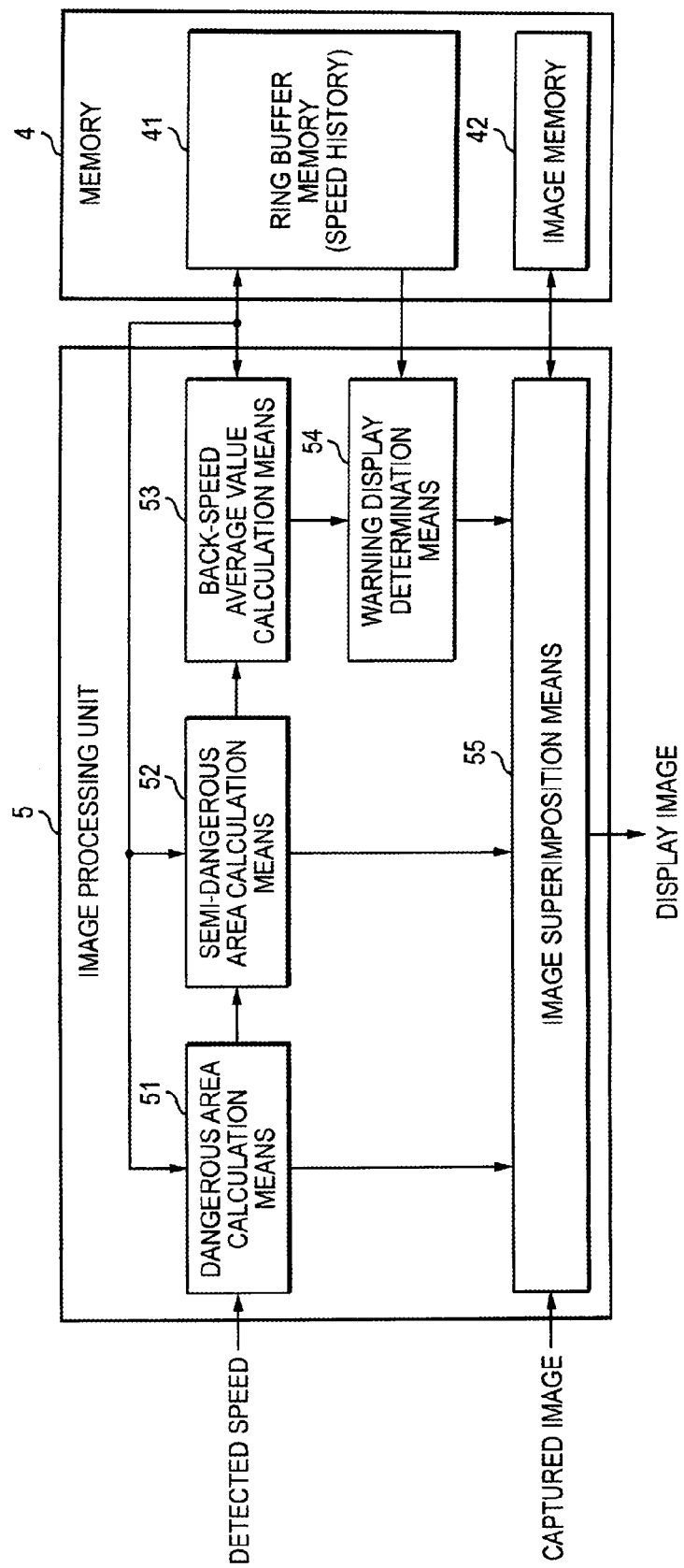
FIG. 2 is a block diagram illustrating a specific configuration of an image processing unit in an illustrative embodiment of the present invention.

As shown in FIG. 2, the memory 4 includes an image memory 42 that stores an image, which is displayed with being superimposed on a captured image output from the imaging unit 3, and a ring buffer memory 41 that stores a speed history of a vehicle.

Returning to FIG. 1, the image processing unit 5 and the controller unit 6 are configured by an LSI, for example.

The image processing unit 5 processes an image signal of a captured image that is output from the imaging unit 3, and outputs a generated image to a display means 9. Here, as the display means 9, an in-vehicle monitor is used, for example.

The controller unit 6 acquires information from a variety of sensors that are mounted on the vehicle. The acquired information includes shift position information that is acquired from a shift position detection sensor 11, brake operation information that is acquired from a brake pedal sensor 12, vehicle speed information that is acquired from a vehicle speed sensor 13, elapsed time information that is acquired from a timer 14, and the like. Additionally, as one example, specific examples of the respective sensors are here described. However, sensors of other types having the same functions may be also used. For example, a hydraulic sensor, a brake displacement amount detection sensor and the like, which detect a brake hydraulic to thus acquire the brake operation information, may be used instead of the brake pedal sensor.

FIG. 2 is a block diagram illustrating a specific configuration of the image processing unit in an illustrative embodiment of the present invention. The image processing unit 5 displays an image, which relates to a braking range depending on the vehicle speed information acquired from the controller unit 6, with being superimposed on the captured image. Here, the image relating to the braking range includes an image indicating a dangerous area and an image indicating a semi-dangerous area, for example.

Specifically, the image processing unit 5 includes a dangerous area calculation means 51 that calculates a dangerous area corresponding to a vehicle collision possibility range, based on the vehicle speed information acquired from the controller unit 6 and a brake characteristic stored in the ring buffer memory 41, and an image superimposition means 55 that superimposes an image, which indicates the dangerous area calculated in the dangerous area calculation means 51, on the captured image output from the imaging unit 3 and displays the same on the display means 9.

Meanwhile, the image processing unit 5 may divide and display the image relating to the braking range in accordance with a degree of urgency of a braking operation to be required. In this case, the image processing unit 5 includes a semi-dangerous area calculation means 52, in addition to the dangerous area calculation means 51. The semi-dangerous area calculation means 52 is to calculate a semi-dangerous area corresponding to the vehicle collision possibility range.

Here, the dangerous area is an area in which a vehicle can be stopped if a driver decides to quickly apply a brake, i.e., an area in which a vehicle can be stopped without colliding with an obstacle if a brake is quickly applied. Also, the semi-dangerous area is an area in which a vehicle is stopped if a driver decides to quickly apply a brake after predetermined seconds, i.e., an area in which a vehicle can be stopped without colliding with an obstacle even if a brake is not quickly applied. Incidentally, the dangerous area may be an area in which a vehicle collides with an obstacle even if a brake is immediately applied and the semi-dangerous area may be an area that is close to a limit in which a vehicle can be stopped without colliding with an obstacle. Also, the predetermined second is appropriately set.

In this illustrative embodiment, the dangerous area calculation means 51 and the semi-dangerous area calculation means 52 calculate a dangerous area and a semi-dangerous area, based on at least the vehicle speed information. Hence, the display ranges of the dangerous area and the semi-dangerous area are changed depending on the speed.

The displays of the dangerous area and the semi-dangerous area will be described with reference to FIGS. 3 and 4. In the drawings, a numeral 20 indicates a rear image that is output from the imaging unit 3, a numeral 21 indicates a superimposed image indicating a dangerous area, a numeral 22 indicates a superimposed image indicating a semi-dangerous area and a numeral 23 indicates a superimposed image indicating path anticipating guide lines.

Figure 3:
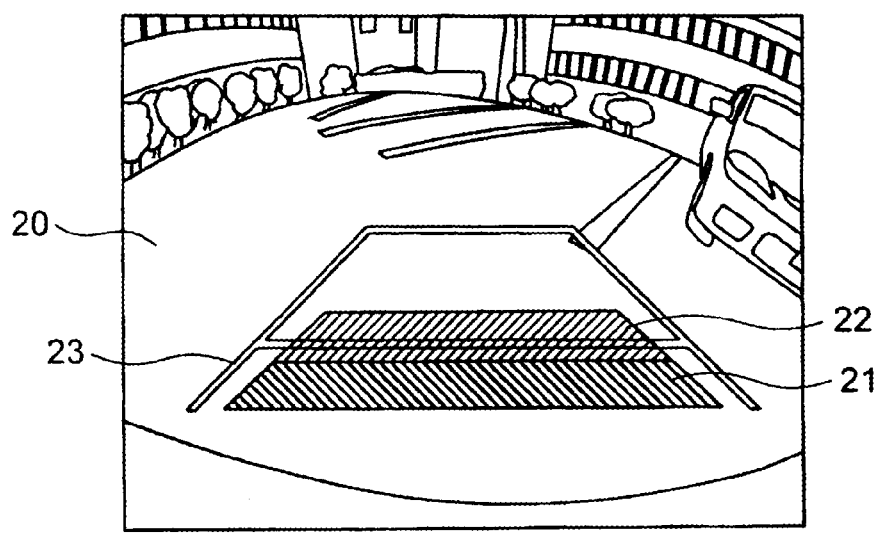
FIG. 3 is a view illustrating an example of a surrounding image.
Figure 4:
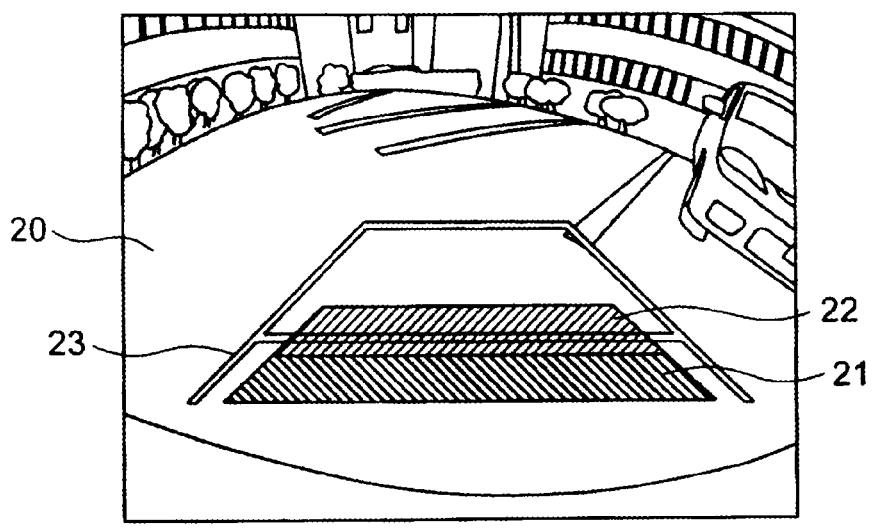
FIG. 4 is a view in which an image indicating a dangerous area is superimposed on the surrounding image, part (A) shows a dangerous area display image at low speed and part (B) shows a dangerous area display image at high speed.
Figure 4:
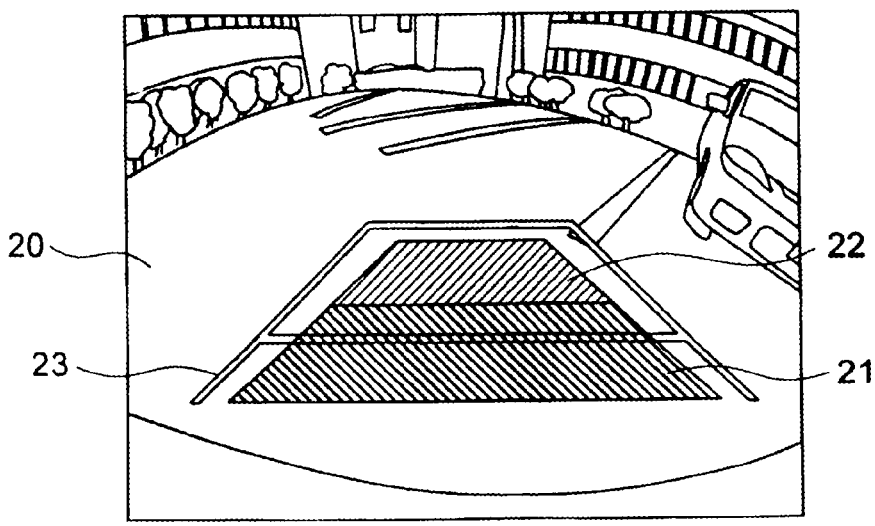

When a rear image shown as shown in FIG. 3 is acquired, as shown in FIG. 4(A), lengths of the dangerous area and the semi-dangerous area in a driving direction are short at low speed, and lengths of the dangerous area and the semi-dangerous area in a driving direction are lengthened at high speed. This is because a braking distance is lengthened at high speed and is shortened at low speed. Also, the dangerous area and the semi-dangerous area may be displayed with different colors, and may be particularly displayed with colors that are complementary colors. Thereby, it is possible to perceive a braking range of a vehicle more clearly.

Like this, the image relating to the braking range is divided and displayed depending on the degree of urgency of the brake operation, so that it is possible to provide the driver with the information relating to the braking range in detail and to improve the operability in the back-driving.

Figure 5:
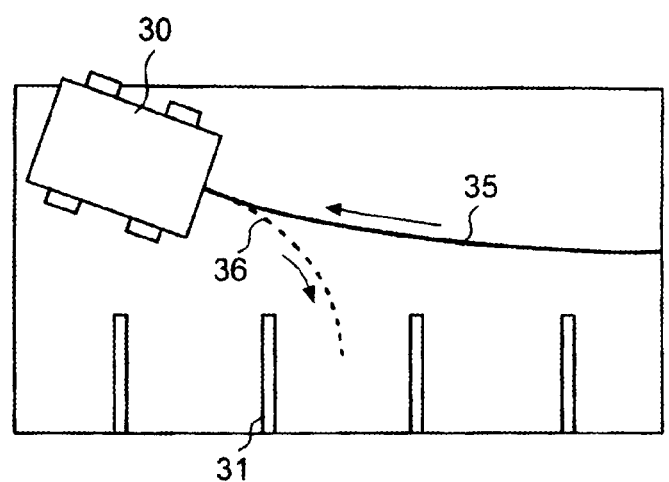
FIG. 5 is a view illustrating a vehicle operation when back parking.
Figure 6:
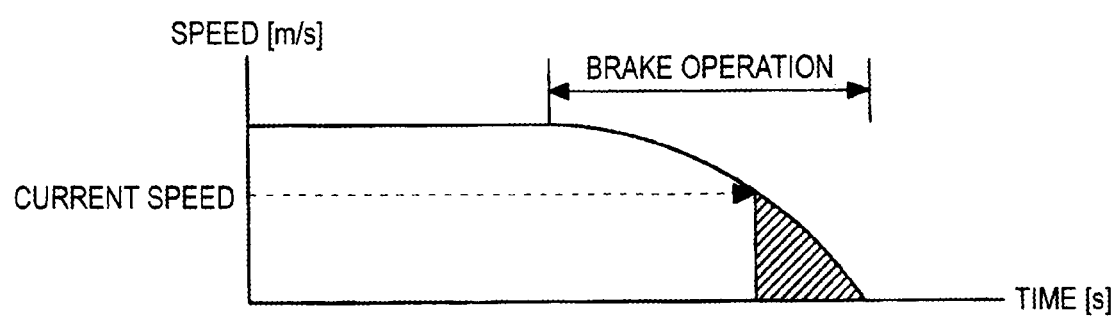
FIG. 6 is a view illustrating a method of calculating a braking distance.

Meanwhile, in this illustrative embodiment, the brake characteristic may include characteristic information of a speed change of the vehicle relative to the elapsed time of the brake operation. As shown in FIG. 5, in general, a vehicle 30 proceeds along a trajectory shown with a solid line 35 and is once stopped at a back starting position just before back-parking. Here, a brake characteristic (speed-time graph) just before the vehicle 30 is stopped at the back starting position is shown in FIG. 6. This shows that a vehicle driving at constant speed is brake-pedaled and the speed thereof becomes zero (0).

When the controller unit 6 detects a brake operation signal from the brake pedal sensor 12, the control unit 6 starts to acquire the vehicle speed information from the vehicle speed sensor 13, also acquires the elapsed time of the brake operation by the timer 14, and then stores a speed change of the vehicle relative to the elapsed time of the brake operation in the ring buffer memory 41.

Then, while the vehicle 30 is back-driving towards a parking area 31 along the trajectory shown with a dotted line 36 of FIG. 5, the controller unit 6 acquires the current vehicle speed information from the vehicle speed sensor 13. Then, the controller unit 6 calculates a vehicle braking distance from the current speed information of the vehicle 30 by using the brake characteristic shown in FIG. 6. The braking distance is a distance from when the driver quickly applies the brake to when the vehicle 30 is stopped.

Also, the controller unit may estimate an actual stop distance by using the braking distance. The actual stop distance is a distance that is acquired by adding a free running distance, which is a distance that the vehicle 30 drives from when a driver decides to apply a brake to when the driver actually applies the brake, to the braking distance.

Stop distance=braking distance+free running distance

In general, the free running distance [m] can be calculated by multiplying reaction time (0.75 [s]) by vehicle speed [m/s]. Incidentally, since the average reaction time of a human is said as 0.75 [s], the corresponding numerical value is here used, as an example. However, the present invention is not limited to the above. Also, the free running distance may not be based on the above equation and may be preset, based on general using situations.

In accordance with the stop distance calculated as described above, the image relating to the braking range may be displayed with being superimposed on the captured image.

As described above, the brake characteristic of the vehicle in the actual braking is stored in the ring buffer memory 41 and the dangerous area is calculated and superimposed on the captured image by the image processing unit 5, based on the vehicle speed information and the brake characteristic, so that the driver can accurately perceive a vehicle collision possibility range. Here, the brake characteristic of the vehicle depends on various conditions such as a vehicle weight, a road surface condition, a brake operation of a driver and the like. In this configuration, the brake characteristic of the vehicle in the actual braking is used to which the above various conditions are added. Therefore, it is possible to provide the driver with the dangerous area more accurately. Thus, regarding the degree of urgency of the brake operation, the brake characteristic may be also considered, in addition to the vehicle speed information.

Incidentally, since the brake characteristic of the vehicle also depends on a loaded situation of the vehicle, it may be set by acquiring information of the loaded situation of the vehicle. Also, regarding the brake characteristic of the vehicle, a predetermined value may be preset based on the general using situations.

Figure 7:
FIG. 7 is a view illustrating divided displays of a dangerous area.
Figure 7:
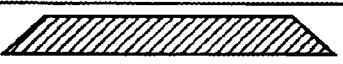
Figure 7:
Figure 7:
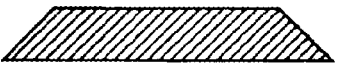
Figure 7:
Figure 7:

Also, the image memory 42 may store therein a table shown in FIG. 7 that is set depending on the stop distance (or braking distance).

In the table, the stop distance is stepwise divided and an image indicating a dangerous area and an image indicating a semi-dangerous area are respectively stored for each stop distance range. The images are prepared based on designs of the imaging optical system such as distortion and image angle, conditions of attaching the vehicle-mounted camera to a vehicle body, and the like.

Figure 8:
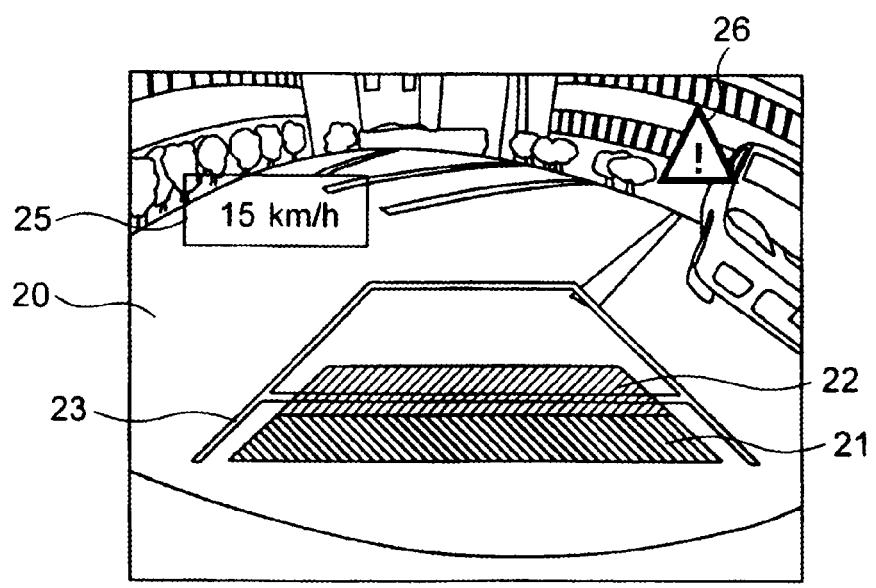
FIG. 8 is a view in which speed information and a warning image are superimposed on a surrounding image.

As shown in FIG. 8, a separate superimposed image from the image relating to the braking range may be displayed. For example, the current vehicle speed information 25 acquired from the vehicle speed sensor 13 may be displayed with being superimposed on the rear image 20.

Also, a warning image 26 may be displayed with being superimposed on the rear image 20 when the vehicle speed reaches a preset designated speed or higher. In this case, as shown in FIG. 2, the image processing unit 5 includes: a back-speed average value calculation means 53 that calculates an average value of the back-speed of the vehicle acquired in the controller unit 6 and stores the same in the ring buffer memory 41; and a warning display determination means 54 that compares a back-speed of a vehicle in actual braking and a threshold, which is set based on an average value of the back-speed, and thus determines whether or not to display a warning. Here, the warning display determination means 54 preferably displays the warning image 26 with being superimposed on the rear image 20 when the back-speed when actual driving exceeds the threshold.

Incidentally, the threshold that is set based on an average value of the back-speed is a speed that is higher than the average value and is to secure safety driving of a vehicle. As an example of a method of setting the threshold, the threshold is set to be an average value+α, in which a is a predetermined value to be higher than 5 km/h and lower than 10 km/h. Also, as another example, the threshold is set to be an average value×β, in which β is a predetermined value to be higher than 1.0 and lower than 2.0.

Like this, the average value of the back-speed is stored and the warning image is superimposed when the back-speed when actual driving exceeds the threshold that is set based on the average value. Thereby, it is possible to further improve the safety of the back-driving. Also, when setting the threshold, the average value of the back-speed stored in the actual braking is used. Thus, it is possible to appropriately set the threshold for each vehicle and each driver.

Figure 9:
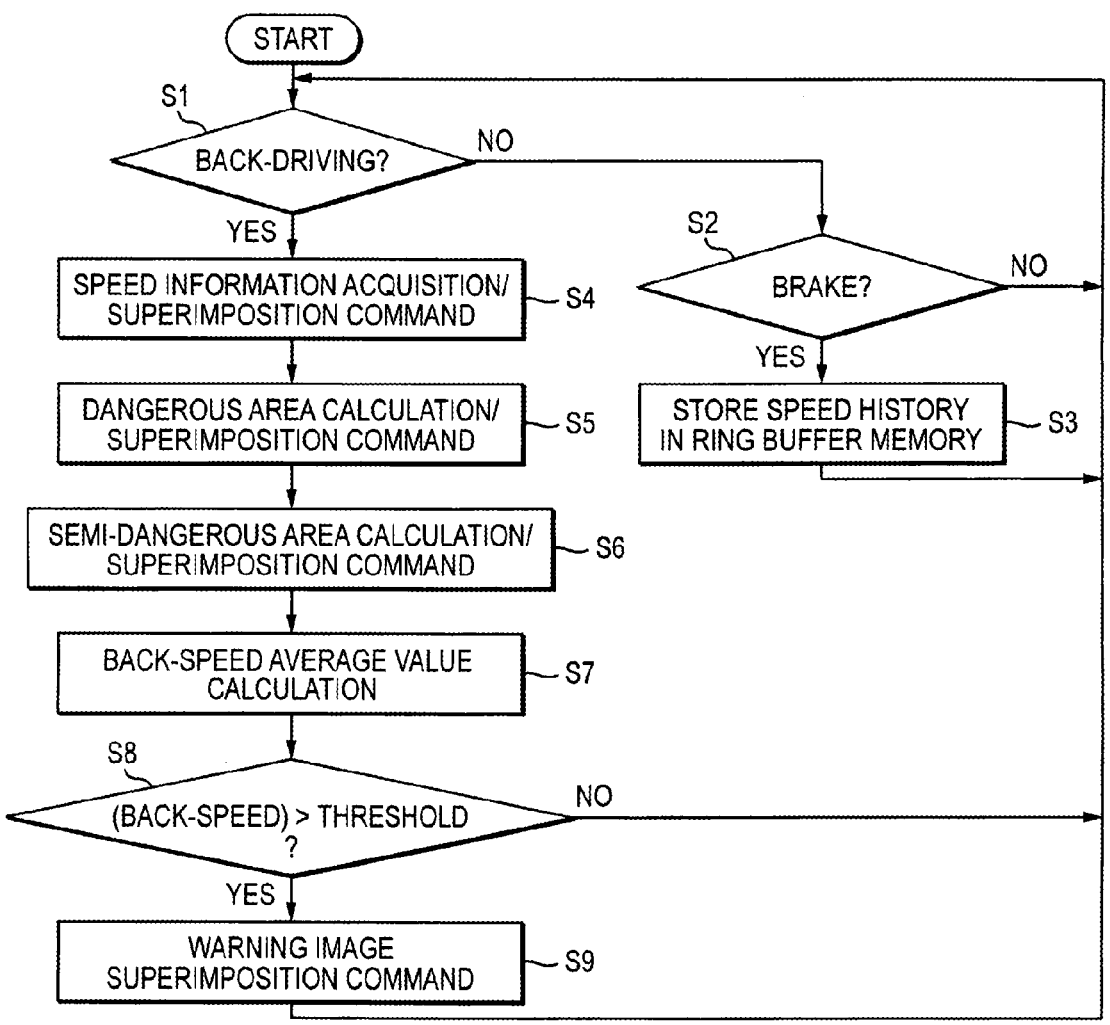
FIG. 9 is flowchart illustrating processing of the vehicle driving assist device according to an illustrative embodiment of the present invention.

Subsequently, processings of the back-driving assist device for the vehicle according to an illustrative embodiment of the present invention will be described with reference to a flowchart shown in FIG. 9.

First, in step S1, the controller unit 6 acquires a position of a shift lever from the shift position detection sensor 11 mounted on the vehicle and determines from the shift position whether the vehicle is back-driving at the moment. When it is determined that the vehicle is not back-driving, the controller unit acquires brake operation information from the brake pedal sensor 12 in step S2 to thus determine whether the brake is applied or not. When the brake is not applied, the controller unit returns to step S1. On the other hand, when the brake is applied, the controller unit stores a speed change (speed history) of the vehicle relative to the elapsed time of the brake operation in the ring buffer memory 41, in step S3. When the vehicle moves forward without back-driving after the brake operation is performed and then the brake operation is again performed, the controller unit may update the speed history by overwriting the acquired speed history on a previous speed history.

When it is determined in step Si that the vehicle is back-driving, the controller unit 6 acquires current speed information of the vehicle from the vehicle speed sensor 13, in step S4. The speed information may be displayed with being superimposed on the captured image by a numerical value.

Also, in step S5, the dangerous area calculation means 51 calculates a dangerous area, based on the current speed information of the vehicle and the latest speed history stored in the ring buffer memory 41, selects a corresponding image from the table shown in FIG. 7 and displays the same with being superimposed on the captured image.

Also, in step S6, the semi-dangerous area calculation means 52 calculates a semi-dangerous area, based on the current speed information of the vehicle and the speed history stored in the ring buffer memory 41, selects a corresponding image from the table shown in FIG. 7 and displays the same with being superimposed on the captured image.

Then, in step S7, the back-speed average value calculation means 53 calculates and stores an average value of the back-speed in the ring buffer memory 41. In step S8, the warning display determination means 54 compares the current back-speed and the threshold that is set based on the average value of the back-speed. Here, when the current back-speed exceeds the threshold, a warning image is displayed with being superimposed on the captured image, in step S9.

According to this illustrative embodiment, when the vehicle is driving, the image relating to the braking range depending on the vehicle speed information is superimposed on the captured image. Therefore, it is possible to reliably and accurately warn any driver to avoid a collision with an obstacle, regardless of the perception or skill of the driver. That is, since the driver can perceive the braking range of the vehicle by this illustrative embodiment, the driver can clearly perceive a position at which the collision with an obstacle can be avoided if the brake is applied. Thus, it is possible to improve the safety in the driving.

Figure 10:
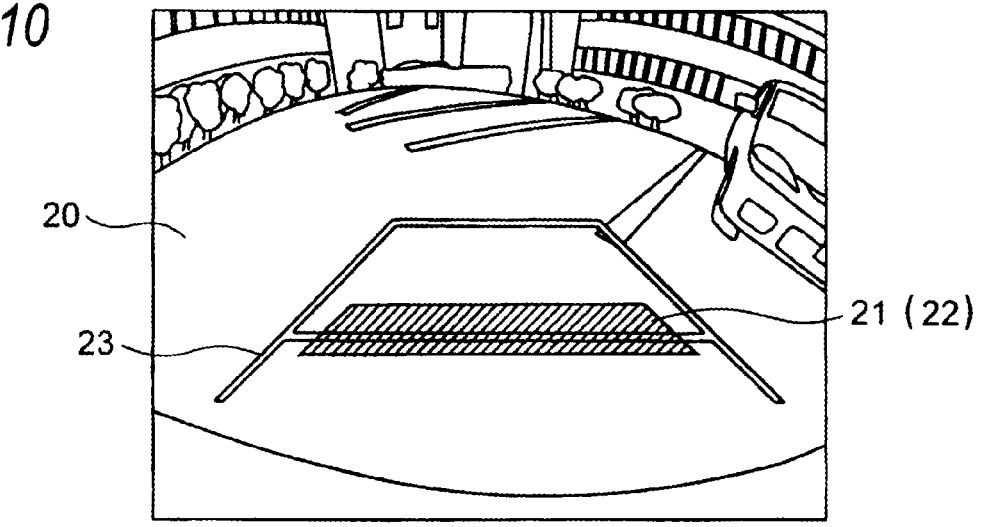
FIG. 10 is a view in which only one of a dangerous area and a semi-dangerous area is superimposed on a captured image.

Also, in the above illustrative embodiment, the image relating to the braking range includes an image indicating a dangerous area and an image indicating a semi-dangerous area. However, as shown in FIG. 10, the image relating to the braking range may indicate any one area.

Also, for example, the image processing unit may blink only the displayed one area or may surround the same with a frame line and blink the frame line. Thereby, the driver can perceive the braking range of the vehicle.

Also, the image processing unit may display an image by using a stripe pattern or by using a stripe pattern configured by a first color and a second color that is a complementary color of the first color. Thereby, since the image is displayed with the different color, the driver can perceive the braking range of the vehicle more clearly. Also in these cases, the display range of the area is changed depending on at least the vehicle speed information.

Also, both an image indicating a dangerous area and an image indicating a semi-dangerous area may be displayed and only any one area may be displayed with the above various patterns.

Figure 11:
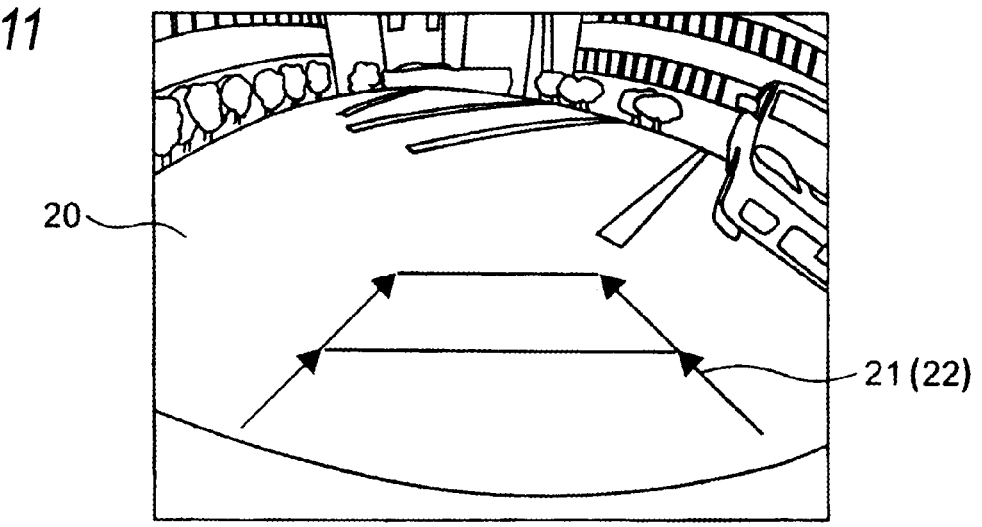
FIG. 11 is a view in which arrows, which are an image indicating a dangerous area, are superimposed on a captured image.

Also, as shown in FIG. 11, the image relating to the braking range may be displayed with a plurality of arrows and leading ends of the arrows may be connected to each other by a line. In this case, since the vehicle driving direction is indicated by the arrows, the path anticipating guide lines 23 may not be displayed. The path anticipating guide lines are not displayed, so that it is possible to reduce an area to be covered by a weight display. Thereby, the driver can perceive the surrounding situations more accurately. Also, a shape of the arrow may be sequentially displayed from the vehicle-side towards a driving direction. Thereby, the driver can drive while considering the vehicle driving direction and the braking range.

Also in this case, the display range of the area is changed depending on at least the vehicle speed information.

Also, arrows corresponding to an image indicating a dangerous area and an image indicating a semi-dangerous area may be displayed and the arrows corresponding to the respective areas may be displayed with the above various patterns. Also, the arrows corresponding to an image indicating a dangerous area and an image indicating a semi-dangerous area may be displayed with different colors, particularly, complementary colors.

Also, in this illustrative embodiment, the vehicle driving assist device has the imaging unit. However, the vehicle driving assist device is not limited to the above. For example, the vehicle driving assist device may have an image acquisition unit that acquires a captured image of a surrounding area of the vehicle from an external device, instead of the imaging unit. That is, a vehicle driving assist device that displays an image captured from a surrounding area of a vehicle on an in-vehicle monitor may include an image acquisition unit that acquires an image captured from the surrounding area of the vehicle, an information acquisition unit that acquires speed information of the vehicle and an image processing unit that processes an image signal of the captured image. The image processing unit may include an image superimposition unit that superimposes an image relating to a braking range depending on the vehicle speed information acquired from the information acquisition unit on the captured image.

Even in the above configuration, since the driver can perceive the braking range of the vehicle, the driver can clearly perceive a position at which the collision with an obstacle can be avoided if the brake is applied. Thus, it is possible to improve the safety in the driving.

Meanwhile, in the above illustrative embodiment of the present invention, the vehicle driving assist device that is used when the vehicle is back-driving has been described. However, the present invention is not limited to the above. That is, the vehicle driving assist device may be used not only when the vehicle is back-driving but also when the vehicle proceeds forward, and the like.

The present invention has been specifically described with reference to the specific illustrative embodiment. However, it is apparent to one skilled in the art that a variety of changes and modifications can be made without departing the spirit and scope of the present invention.

The application is based on a Japanese Patent Application No. 2011-015798 filed on Jan. 27, 2011, the contents thereof being incorporated herein by reference.

DESCRIPTION OF THE REFERENCE NUMERALS

1: back-driving assist device for the vehicle
2: imaging optical system
3: imaging unit
4: memory 5: image processing unit
6: controller unit
9: display means
41: ring buffer memory
42: image memory
51: dangerous area calculation means
52: semi-dangerous area calculation means
53: back-speed average value calculation means
54: warning display determination means

The invention claimed is:

1. A vehicle driving assist device that displays an image captured from a surrounding area of a vehicle on an in-vehicle monitor, the device comprising:
   an imaging unit that is mounted on the vehicle and captures an image from a surrounding area of the vehicle;
   an information acquisition unit that acquires speed information of the vehicle; and
   an image processing unit that processes an image signal of the captured image output from the imaging unit,
   wherein the image processing unit has an image superimposition unit that superimposes an image, which relates to a braking range depending on the speed information of the vehicle acquired from the information acquisition unit, on the captured image, and
   wherein the image processing unit divides and displays the image relating to the braking range into a plurality of images in accordance with a degree of urgency of a brake operation to be required.

2. The vehicle driving assist device according to claim 1, wherein the image processing unit blinks the image relating to the braking range.

3. The vehicle driving assist device according to claim 1, wherein the image processing unit surrounds the image relating to the braking range with a frame line and blinks the frame line.

4. The vehicle driving assist device according to claim 1, wherein the image processing unit displays the image relating to the braking range by using a stripe pattern.

5. The vehicle driving assist device according to claim 4, wherein the stripe pattern is configured by a first color and a second color that is a complementary color of the first color.

6. The vehicle driving assist device according to claim 1, wherein the image processing unit displays the image relating to the braking range by a plurality of arrows.

7. The vehicle driving assist device according to claim 6, wherein leading ends of the arrows are connected to each other by a line.

8. The vehicle driving assist device according to claim 6, wherein the image processing unit sequentially displays a shape of the arrow from a vehicle-side towards a driving direction.

9. The vehicle driving assist device according to claim 1, wherein the image processing unit displays the image relating to the braking range, based on the speed information and a free running distance.

10. The vehicle driving assist device according to claim 1, further comprising
    a storage unit that stores a brake characteristic in actual braking of the vehicle, which is acquired from the information acquisition unit,
    wherein the image processing unit further has a dangerous area calculation unit that calculates a dangerous area corresponding to a collision possibility range of the vehicle, based on the speed information of the vehicle acquired from the information acquisition unit and the brake characteristic stored in the storage unit, and
    wherein the image superimposition unit superimposes an image indicating the dangerous area on the captured image.

11. The vehicle driving assist device according to claim 10, wherein the brake characteristic includes characteristic information of a speed change of the vehicle in response to elapsed time of a brake operation.

12. The vehicle driving assist device according to claim 10, wherein the image processing unit displays the image relating to the braking range, based on the brake characteristic and a free running distance.

13. The vehicle driving assist device according to claim 1, wherein the image processing unit displays the divided images with different colors, respectively.

14. A vehicle driving assist device that displays an image captured from a surrounding area of a vehicle on an in-vehicle monitor, the device comprising:
    an imaging unit that is mounted on the vehicle and captures an image from a surrounding area of the vehicle;
    an information acquisition unit that acquires speed information of the vehicle;
    an image processing unit that processes an image signal of the captured image output from the imaging unit; and
    a storage unit that stores an average value of back-speed of the vehicle acquired from the information acquisition unit,
    wherein the image processing unit has an image superimposition unit that superimposes an image, which relates to a braking range depending on the speed information of the vehicle acquired from the information acquisition unit, on the captured image, and
    wherein the image processing unit compares the back-speed of the vehicle acquired from the information acquisition unit and a threshold, which is set based on the average value, and superimposes a warning image on the captured image when the back-speed exceeds the threshold.

15. A vehicle driving assist device that displays an image captured from a surrounding area of a vehicle on an in-vehicle monitor, the device comprising:
    an image acquisition unit that acquires an image captured from the surrounding area of the vehicle;
    an information acquisition unit that acquires speed information of the vehicle, and
    an image processing unit that processes an image signal of the captured image,
    wherein the image processing unit has an image superimposition unit that superimposes an image, which relates to a braking range depending on the speed information of the vehicle acquired from the information acquisition unit, on the captured image, and
    wherein the image processing unit divides and displays the image relating to the braking range into a plurality of images in accordance with a degree of urgency of a brake operation to be required.

* * * * *